(12) United States Patent
Han (10) Patent No.: US 12,494,030 B2
(45) Date of Patent: Dec. 9, 2025

(54) AUTONOMOUS VEHICLE TELESCOPIC SENSOR SYSTEM

(71) Applicant: TuSimple, Inc., San Diego, CA (US)

(72) Inventor: Charles Seunghwan Han, San Diego, CA (US)

(73) Assignee: TUSIMPLE, INC., San Diego, CA (US)

( * ) Notice: Subject to any disclaimer, the term of this patent is extended or adjusted under 35 U.S.C. 154(b) by 442 days.

(21) Appl. No.: 18/069,056

(22) Filed: Dec. 20, 2022

(65) Prior Publication Data

US 2023/0121847 A1    Apr. 20, 2023

Related U.S. Application Data

(63) Continuation of application No. 16/870,866, filed on May 8, 2020, now Pat. No. 11,573,289.

(51) Int. Cl.
| | |
|---|---|
| *H04N 23/90* | (2023.01) |
| *G06V 10/147* | (2022.01) |
| *G06V 20/56* | (2022.01) |
| *H04N 23/54* | (2023.01) |
| *H04N 23/695* | (2023.01) |
| *G01S 7/02* | (2006.01) |
| *G01S 13/931* | (2020.01) |

(52) U.S. Cl.
CPC ............ *G06V 10/147* (2022.01); *G06V 20/56* (2022.01); *H04N 23/54* (2023.01); *H04N 23/695* (2023.01); *H04N 23/90* (2023.01); *G01S 7/027* (2021.05); *G01S 2013/9323* (2020.01)

(58) Field of Classification Search
CPC .... G06V 10/147; G06V 20/56; H04N 23/695; H04N 23/54; H04N 23/90; G01S 2013/9323; G01S 7/027
See application file for complete search history.

(56) References Cited

U.S. PATENT DOCUMENTS

| | | | |
|---|---|---|---|
| 10,255,670 B1 | 4/2019 | Wu et al. | |
| 11,479,213 B1 * | 10/2022 | Kentley-Klay | ........ G01S 17/931 |
| 2005/0052527 A1 | 3/2005 | Remy et al. | |
| 2014/0348304 A1 | 11/2014 | Guldstrand et al. | |
| 2015/0172520 A1 | 6/2015 | Lindman et al. | |

(Continued)

FOREIGN PATENT DOCUMENTS

WO        2017177205 A1    10/2017

*Primary Examiner* — Mathew Franklin Gordon
(74) *Attorney, Agent, or Firm* — Perkins Coie LLP (57) ABSTRACT

A telescopic sensor system for an autonomous vehicle enables sensors located on movable telescopic apparatuses to obtain sensor data when an object obstructs an area scanned by fixed sensors. An example method of controlling a movable telescopic apparatus on an autonomous vehicle includes obtaining, from a first sensor located on the autonomous vehicle, a first sensor data of a first area relative to a location of the autonomous vehicle, performing, from the first sensor data, a first determination that a view of the first area is obstructed, causing, in response to the first determination, a second sensor coupled to the movable telescopic apparatus to extend to a pre-determined position, and obtaining, from the second sensor, a second sensor data of a second area relative to the location of the autonomous vehicle, where the second area includes at least some of the first area.

20 Claims, 6 Drawing Sheets

(56) References Cited

U.S. PATENT DOCUMENTS

| | | |
|---|---|---|
| 2015/0228028 A1 | 8/2015 | Friedman et al. |
| 2017/0045808 A1 | 2/2017 | Kennair et al. |
| 2017/0070665 A1 | 3/2017 | Lu et al. |
| 2018/0091716 A1 | 3/2018 | Brand et al. |
| 2018/0180719 A1 | 6/2018 | Bier |
| 2019/0061625 A1 | 2/2019 | Göttlicher et al. |
| 2019/0385025 A1* | 12/2019 | McMichael ............ G06V 10/82 |
| 2020/0258382 A1 | 8/2020 | Shi et al. |
| 2021/0349180 A1 | 11/2021 | Han |

* cited by examiner

AUTONOMOUS VEHICLE TELESCOPIC SENSOR SYSTEM

CROSS-REFERENCE TO RELATED APPLICATIONS

This application is a continuation of U.S. patent application Ser. No. 16/870,866, filed on May 8, 2020. The aforementioned application of which is incorporated by reference in its entirety.

TECHNICAL FIELD

This document relates to techniques to operate one or more telescopic sensors on an autonomous vehicle.

BACKGROUND

A vehicle may include cameras for several purposes. For example, cameras may be attached to a roof of the vehicle for security purposes, for driving aid, or for facilitating autonomous driving. Cameras mounted on a vehicle can obtain images of one or more areas surrounding the vehicle. These images can be processed to obtain information about the road or about the objects surrounding the autonomous vehicle. Thus, the images obtained from the cameras on an autonomous vehicle can be used to safely maneuver the autonomous vehicle through traffic or on a highway.

SUMMARY

An autonomous vehicle equipped with a telescopic sensor system can include a movable telescopic apparatus that can extend and/or retract one or more sensors on the autonomous vehicle so that data obtained by the one or more sensors can provide better information about an environment in which the autonomous vehicle is operated.

An example method of controlling a movable telescopic apparatus on an autonomous vehicle comprises obtaining, from a first sensor located on the autonomous vehicle, a first sensor data of a first area relative to a location of the autonomous vehicle; performing, from the first sensor data, a first determination that a view of the first area is obstructed; causing, in response to the first determination, a second sensor coupled to the movable telescopic apparatus to extend to a pre-determined position; and obtaining, from the second sensor, a second sensor data of a second area relative to the location of the autonomous vehicle, where the second area includes at least some of the first area.

In some embodiments, the first determination is performed by determining that a presence of an object in the first area obstructs the sensor from obtaining the sensor data of a least a portion of the first area obstructed by the object. In some embodiments, the method further includes performing a second determination that the object is absent from the second sensor data or that the second sensor data includes at most a portion of the object having a first size less than or equal to a pre-determined fraction of a second size of the object in the first sensor data; and causing, in response to the second determination, the movable telescopic apparatus to retract towards the autonomous vehicle to a retracted position.

In some embodiments, the movable telescopic apparatus is caused to extend and retract by sending instructions to actuate a motor associated with the movable telescopic apparatus. In some embodiments, the movable telescopic apparatus includes a housing in which the second sensor and the movable telescopic apparatus in the retracted position is located, where the method further includes: sending, before sending a first instruction to the motor to extend the movable telescopic apparatus, a second instruction to another motor associated with the housing, where the third instruction causes a cover associated with the housing to open by actuating the another motor; and sending, after sending a third instruction to the motor to retract the movable telescopic apparatus, a fourth instruction that causes the cover to close by actuating the another motion.

In some embodiments, the method further comprises causing the movable telescopic apparatus to remain in the retracted position in response to a speed of the autonomous vehicle being greater than or equal to a speed threshold. In some embodiments, the method further comprises performing a third determination that the second sensor data includes at most a portion of the object having a first size greater than a pre-determined fraction times a second size of the object in the first sensor data; and causing, in response to the third determination, the second sensor coupled to the movable telescopic apparatus to extend to a second pre-determined position, where the second pre-determined position is located further away from the autonomous vehicle compared to the pre-determined position.

An example system comprising a computer that includes a processor and a memory comprising stored instructions that upon execution configure the processor to: obtain, from a first sensor located on an autonomous vehicle, a first sensor data of a first area relative to a location of the autonomous vehicle; perform, from the first sensor data, a first determination that a view of the first area is obstructed; cause, in response to the first determination, a second sensor coupled to a movable telescopic apparatus to extend to a pre-determined position; and obtain, from the second sensor, a second sensor data of a second area relative to the location of the autonomous vehicle, where the second area includes at least some of the first area.

In some embodiments, the movable telescopic apparatus is extendable to a plurality of pre-determined positions, and where the pre-determined position is selected from the plurality of pre-determined positions based on a speed of the autonomous vehicle. In some embodiments, prior to the cause the second sensor coupled to the movable telescopic apparatus to extend to the pre-determined position, the processor is further configured to select, from a plurality of sensors or a plurality of movable telescopic apparatus, the second sensor or the movable telescopic apparatus based on a type of sensor associated with the first sensor and based on a direction in which the first sensor is oriented. In some embodiments, the second sensor data is obtained after the movable telescopic apparatus is extended to the pre-determined position.

In some embodiments, the movable telescopic apparatus includes a double scissor structure or a telescopic rod. In some embodiments, the first sensor is a sensor that is fixed in position on the autonomous vehicle. In some embodiments, the first sensor and the second sensor are a same type of sensor. In some embodiments, the first sensor and the second sensor include a first camera and a second camera, or a first Light Detection and Ranging (LiDAR) sensor and a second LiDAR sensor, or a first radar and a second radar.

A non-transitory computer readable storage medium having code stored thereon, the code, when executed by a processor, causing the processor to implement a method comprising obtaining, from a first sensor located on an autonomous vehicle, a first sensor data of a first area relative to a location of the autonomous vehicle; performing, from the first sensor data, a first determination that a presence of an object in the first area obstructs the sensor from obtaining the sensor data of a least a portion of the first area obstructed by the object; causing, in response to the first determination, a second sensor coupled to a movable telescopic apparatus to extend to a pre-determined position; and obtaining, from the second sensor, a second sensor data of a second area relative to the location of the autonomous vehicle, where the second area includes at least some of the first area.

In some embodiments, the method further comprises performing a second determination that the second sensor data includes at most a portion of the object; and causing, in response to the second determination, the movable telescopic apparatus to retract towards the autonomous vehicle to a retracted position. In some embodiments, the method further comprises: performing a third determination that the second sensor data includes at most a portion of the object; and causing, in response to the third determination, the second sensor coupled to the movable telescopic apparatus to extend to a second pre-determined position, where the second pre-determined position is located further away from the autonomous vehicle compared to the pre-determined position.

In some embodiments, the movable telescopic apparatus is extendable to a plurality of pre-determined positions, and where the pre-determined position is selected from the plurality of pre-determined positions. In some embodiments, the first sensor and the second sensor include a first camera and a second camera.

In yet another exemplary aspect, the above-described method is embodied in the form of processor-executable code and stored in a computer-readable program medium or a computer-readable storage medium. Thus, a non-transitory computer readable storage medium can have code stored thereon, where the code, when executed by a processor, causes the processor to implement the method described in some embodiments.

In yet another exemplary embodiment, an image processing apparatus or device that includes a processor that is configured or operable to perform the above-described methods is disclosed.

The above and other aspects and their implementations are described in greater detail in the drawings, the descriptions, and the claims.

DETAILED DESCRIPTION

Autonomous vehicles use sensors such as cameras, Light Detection and Ranging (LiDAR), and/or Radars that provides data or images of one or more areas surrounding the autonomous vehicle. For example, multiple cameras located on a front region of a roof of the autonomous vehicle can provide images of an area in front of the autonomous vehicle. A computer located in the autonomous vehicle can process the sensor data to determine the presence or absence of objects (e.g., vehicles or pedestrians) located within a range from a location of the autonomous vehicle.

Figure 1A:
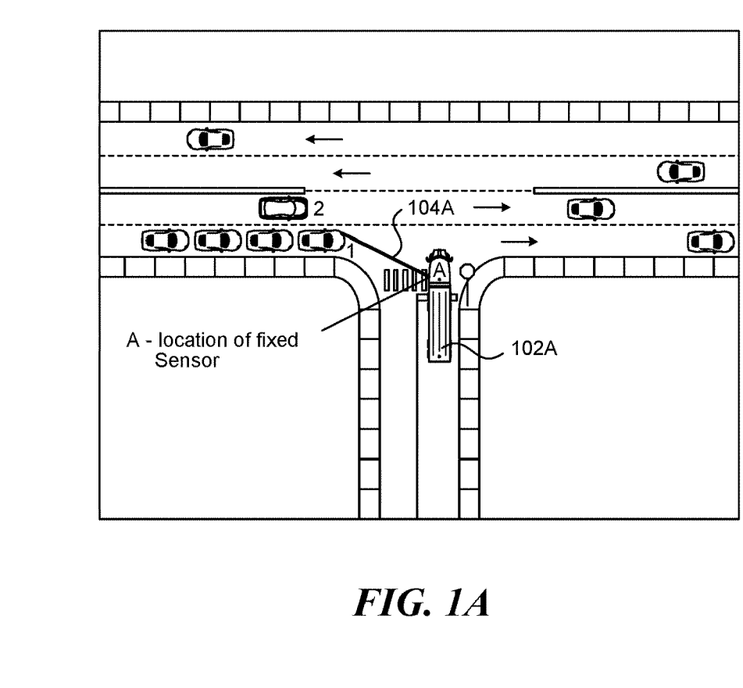
FIG. 1A shows a scenario where a fixed sensor obtains sensor data where the fixed sensor is located on an autonomous vehicle obtains sensor data.

An autonomous vehicle that is driven on a local road or that has stopped at a local intersection can experience scenarios where an area scanned by a sensor can be obstructed by an object such as outgrown tree branches, a construction equipment, a large vehicle on adjacent lanes, etc., For example, in FIG. 1A, an autonomous vehicle 102A is stopped at stop sign and includes at least one fixed camera whose field of view 104A is fixed to capture images to the left of the autonomous vehicle 102A. As shown in FIG. 1A, the field of view 104A of the fixed camera is blocked by Vehicle 1 so that the images obtained the fixed camera do not capture Vehicle 2. In some cases, a computer located in the autonomous vehicle 102A includes an algorithm that may determine not to move the autonomous vehicle 102A until the fixed camera can obtain an image without the obstructing object Vehicle 1. This is because an obstructing object can compromise safety by creating blind spots for the autonomous vehicle 102A.

Figure 1B:
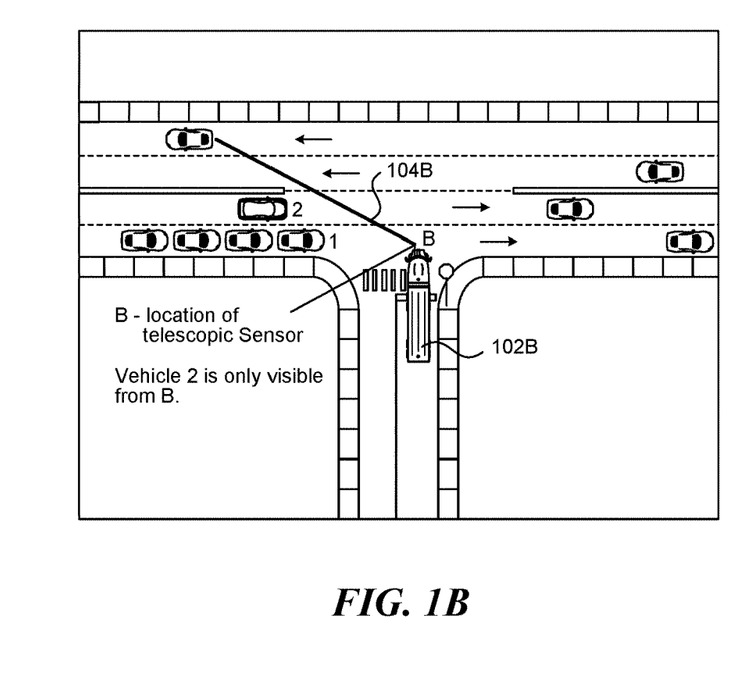
FIG. 1B shows a scenario where a movable sensor obtains sensor data where the movable sensor is located on a movable telescopic apparatus on an autonomous vehicle.

To overcome at least the technical problems with scenarios where an object blocks or obstructs a sensor's field of view or scan area, this patent document describes technology to enable a sensor located on a movable telescopic apparatus to be moved along an axis to obtain sensor data of the area without the obstructing object or without most of the obstructing object. For example, in FIG. 1B, an autonomous vehicle 102B includes a camera located on a movable telescopic apparatus which can move, for example, forward to enable the camera to have a field of view 104B enabling the camera to obtain images that indicate that presence of Vehicle 2. The movable telescopic apparatus can be located, for example, on a roof of the autonomous vehicle 102B or on a bumper of the autonomous vehicle 102B or on a side of the autonomous vehicle 102B.

Figure 1C:
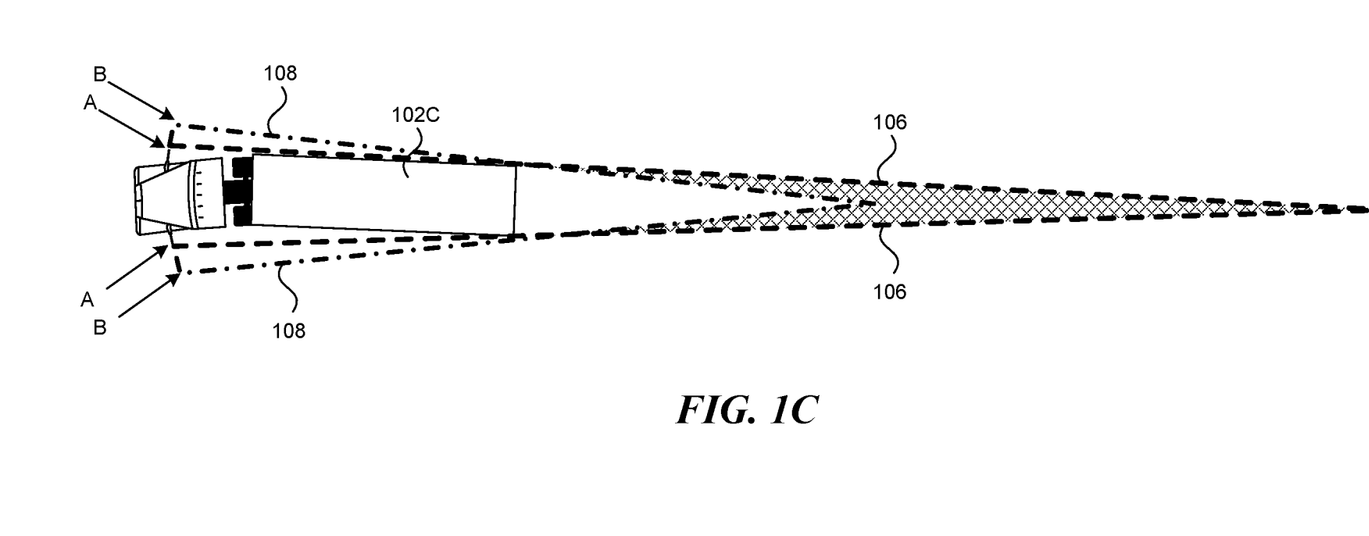
FIG. 1C shows a comparison between a blind spot area of a movable sensor and a blind spot area of a fixed sensor.

In yet another example, in FIG. 1C, an autonomous vehicle 102C includes two sensors located on a movable telescopic apparatus which can extend, for example, outward to enable the sensor to minimize the blind spot behind the autonomous vehicle 102C. The movable telescopic apparatus can be mounted on side panels of the autonomous vehicle. In FIG. 1C, the fixed sensors located at position A can have a blind spot area in between lines 106. Compared to the fixed sensors, sensors located on movable telescopic apparatus can be moved outwards (or away from the autonomous vehicle 102C) to position B so that a blind spot area in between lines 108 is smaller than the blind spot area in between lines 106. As shown in FIG. 1C, the area in between the two blind spot areas is shown with a pattern to indicate an improved visibility gained by moving the sensors to position B using the movable telescopic apparatus.

Furthermore, compared to the data provided by the fixed sensor located at position A, the data provided by the movable sensor located at position B can be analyzed by the sensor data module to provide a more accurate distance approximation from the back of the trailer unit. In some embodiments, the movable telescopic apparatus can be coupled to the autonomous vehicle so that the movable telescopic apparatus extends an angle relative to, for example, a side of the autonomous vehicle. FIG. 1C shows the movable sensor at position B is extended to be closer to the trailer unit compared to the fixed sensor at position A. Thus, the movable sensor at position B can provide wide angle views with a focal distance to objects behind the trailer unit that is closer than a focal distance provided by the fixed sensor at position A.

As further explained in this patent document, the movable telescopic apparatus can extend or retract independently of a movement of the autonomous vehicle. The movable telescopic apparatus can also be retracted within a housing or retracted to a position closest to the autonomous vehicle to minimize drag and/or clearance when the autonomous vehicle is driven. Thus, the movable telescopic apparatus is beneficial over permanent extensions that can be easily broken, can require additional clearance, and can increase drag when the autonomous vehicle is driven.

The example headings for the various sections below are used to facilitate the understanding of the disclosed subject matter and do not limit the scope of the claimed subject matter in any way. Accordingly, one or more features of one example section can be combined with one or more features of another example section.

I. Design and Features of Movable Telescopic Apparatus

Figure 2A:
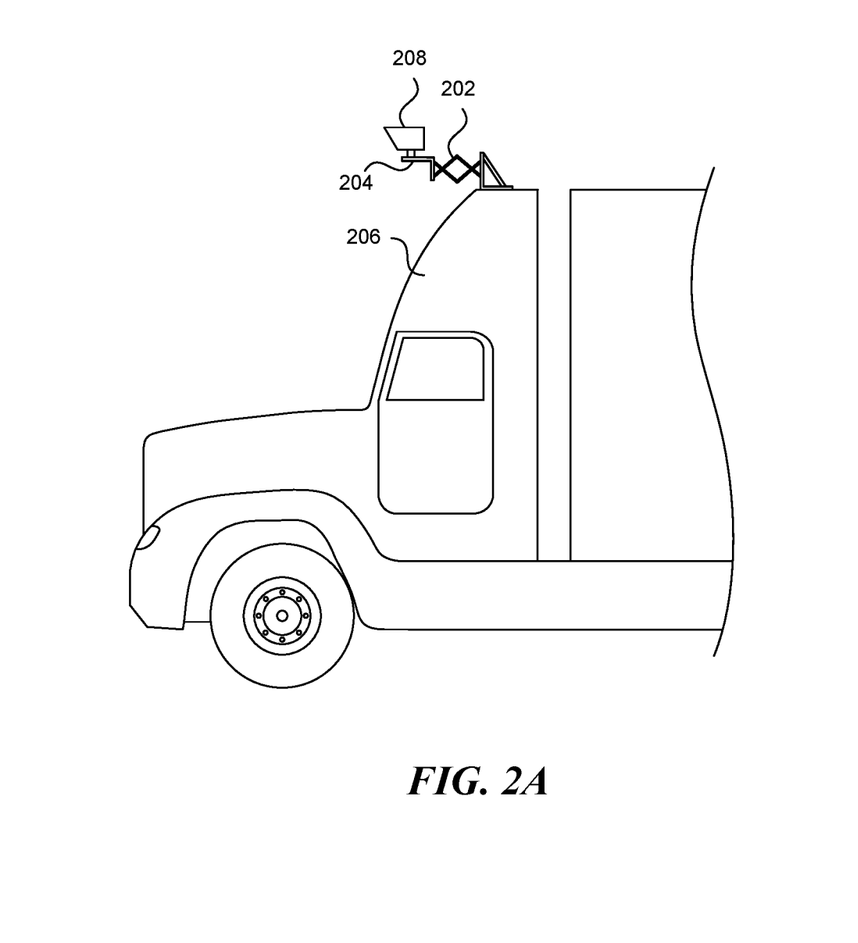
FIG. 2A-2B shows two example designs for a movable telescopic apparatus.
Figure 2B:
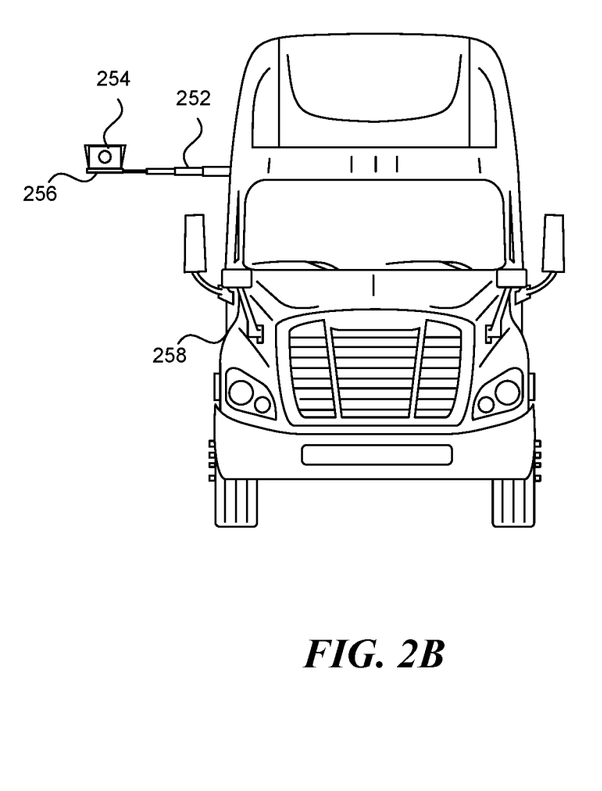

FIG. 2A-2B shows two example designs for a movable telescopic apparatus. FIG. 2A shows a double scissor structure 202 that includes a platform 204. The double scissor structure 202 can be coupled to, for example, a roof of an autonomous semi-trailer truck 206. The double scissor structure 202 can be extended and/or retracted by a motor that turns a screw associated with the double scissor structure 202. A sensor such as a camera 208 is coupled to the platform 204. FIG. 2B shows another example of a telescopic rod 252 coupled to a side structure of the autonomous vehicle 258. The end of the telescopic rod 252 includes a platform 256 on which a sensor 254 is coupled. The telescopic rod 252 can be extended outward and retracted using a motor. The distance and/or direction of movement of the platforms 204 and 256 can be controlled by a sensor movement module (shown as 425 in FIG. 4) as further described below in Section II of this patent document.

FIG. 2B further illustrates the benefit of having a movable telescopic apparatus compared to a sensor located on a fixed extended structure. If the sensor 254 was located on a fixed extended structure, then such a design would not enable the autonomous vehicle 258 to be safely driven. Thus, the movable telescopic apparatus is advantageous over a fixed extended structure. In some embodiments, as further explained in this patent document, the movable telescopic apparatus can be extended in limited or specific driving conditions to facilitate safe operation (e.g., extending the movable telescopic apparatus when speed of autonomous vehicle is below a threshold or a length of the extension of the movable telescopic apparatus may be based on speed of the autonomous vehicle).

In FIGS. 2A and 2B, the sensors 208 and 254 are shown to point towards a front of the autonomous semi-trailer truck. The sensors 208 and 254 may be oriented in any desired direction. For example, the sensor 254 may be oriented to point to a rear of the autonomous semi-trailer truck 258 (e.g., towards the trailer unit). In another example, the sensor 208 may be oriented to point to one of the sides of the autonomous semi-trailer truck 206.

In some embodiments, as shown in FIG. 2A, the double scissor structure 202 can be oriented to extend in a forward direction closer to the front bumper of the autonomous semitrailer truck 206 or to retract away from the front bumper of the autonomous semitrailer truck 206. In some embodiments, as shown in FIG. 2B, the telescopic rod 252 can be oriented to extend in a sideways direction away from a door or side panel of the autonomous semitrailer truck 258 or to retract towards the door or side panel of the autonomous semitrailer truck 258. In some embodiments, the double scissor structure 202 or the telescopic rod 252 can be oriented to extend in an upward direction away from a roof of an autonomous semitrailer truck or to retract towards the roof of the autonomous semitrailer truck. The movable telescopic apparatus is in a neutral position when it is fully retracted at a position closest to the autonomous vehicle.

The example designs for the movable telescopic apparatus as shown in FIGS. 2A and 2B are not limited to the scenarios described above. For example, the telescopic rod 252 can be coupled to the roof of the autonomous vehicle and can extend and retract (e.g., away from and towards the roof) or the double scissor structure 202 can be coupled to a side structure of an autonomous vehicle and can extend outward and retract (e.g., away from and towards the side structure).

Figure 2C:
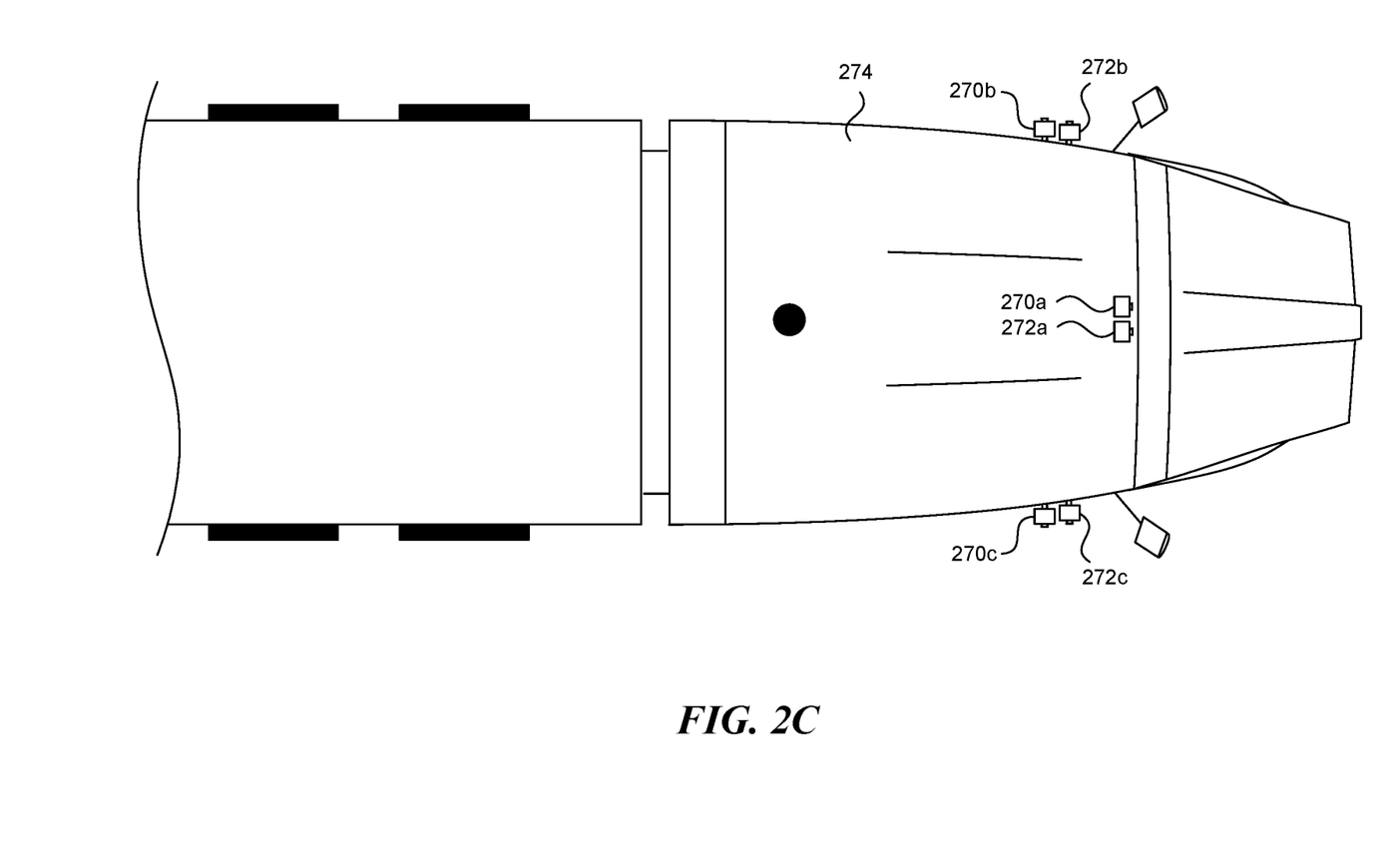
FIG. 2C shows an example telescopic sensor system where movable telescopic apparatuses are associated with or located next to fixed sensors on an autonomous vehicle.

FIG. 2C shows an example telescopic sensor system where movable telescopic apparatuses 270a-270c are associated with or located next to each of three fixed sensors 272a-272c on an autonomous vehicle 274. The fixed sensor 272a is coupled to a roof of a tractor unit of the autonomous vehicle 274 and is pointing in a direction towards the front of the autonomous vehicle 274 or in a direction in which the autonomous vehicle 274 is to be driven. The fixed sensors 272b and 272c are also coupled to the autonomous vehicle 274 and point in a direction to the two sides of the autonomous vehicle 274. In some embodiments, a sensor coupled to a movable telescopic apparatus can be located next to or adjacent to each fixed sensor.

The telescopic sensor system can be setup in a redundant architecture where the sensor coupled to the movable telescopic apparatus can be of the same sensor type as the fixed sensor that may be next to the movable telescopic apparatus. For example, if fixed sensor 272a is a camera, then sensor coupled to the movable telescopic apparatus 270a is also a camera. In this example, as further explained in this patent document, if the image obtained by the camera 272a is determined to include an obstructing object, then camera coupled to a platform on the movable telescopic apparatus 270a can be extended or moved to obtain an image without the obstructing object or without most of the obstructing image. In another example, if an image obtained by LiDAR 272c is determined to include an obstructing object, then the LiDAR coupled to a platform on the movable telescopic apparatus 270c can be extended or moved to obtain sensor data without the obstructing object or without most of the obstructing object. As further described in Section II of this patent document, after a determination is made that a sensor on an extended movable telescopic apparatus has obtained sensor data without the obstructing object or without most of the obstructing object, the motor of the movable telescopic apparatus is instructed to retract or move the sensor to a neutral position.

In some embodiments, the movable telescopic apparatus when in a neutral or retracted position can be located in a housing. The housing includes a cover that can be opened or closed by sending instructions to a motor located on the housing. The housing can enable the movable telescopic apparatus to be safely deployed while the autonomous vehicle is in motion, parked, or stopped (e.g., stopped at intersection or at traffic light). After the cover of the housing is opened, the movable telescopic apparatus can be extended or moved to another position so that a sensor can obtain sensor data without the obstructing object or without most of the obstructing object. After the sensor on an extended movable telescopic apparatus has obtained sensor data without the obstructing object or without most of the obstructing object, the motor of the movable telescopic apparatus is instructed to retract or move the sensor to a neutral position and the motor associated with the cover is instructed to close the cover.

II. Movable Telescopic Apparatus Operations

Figure 4:
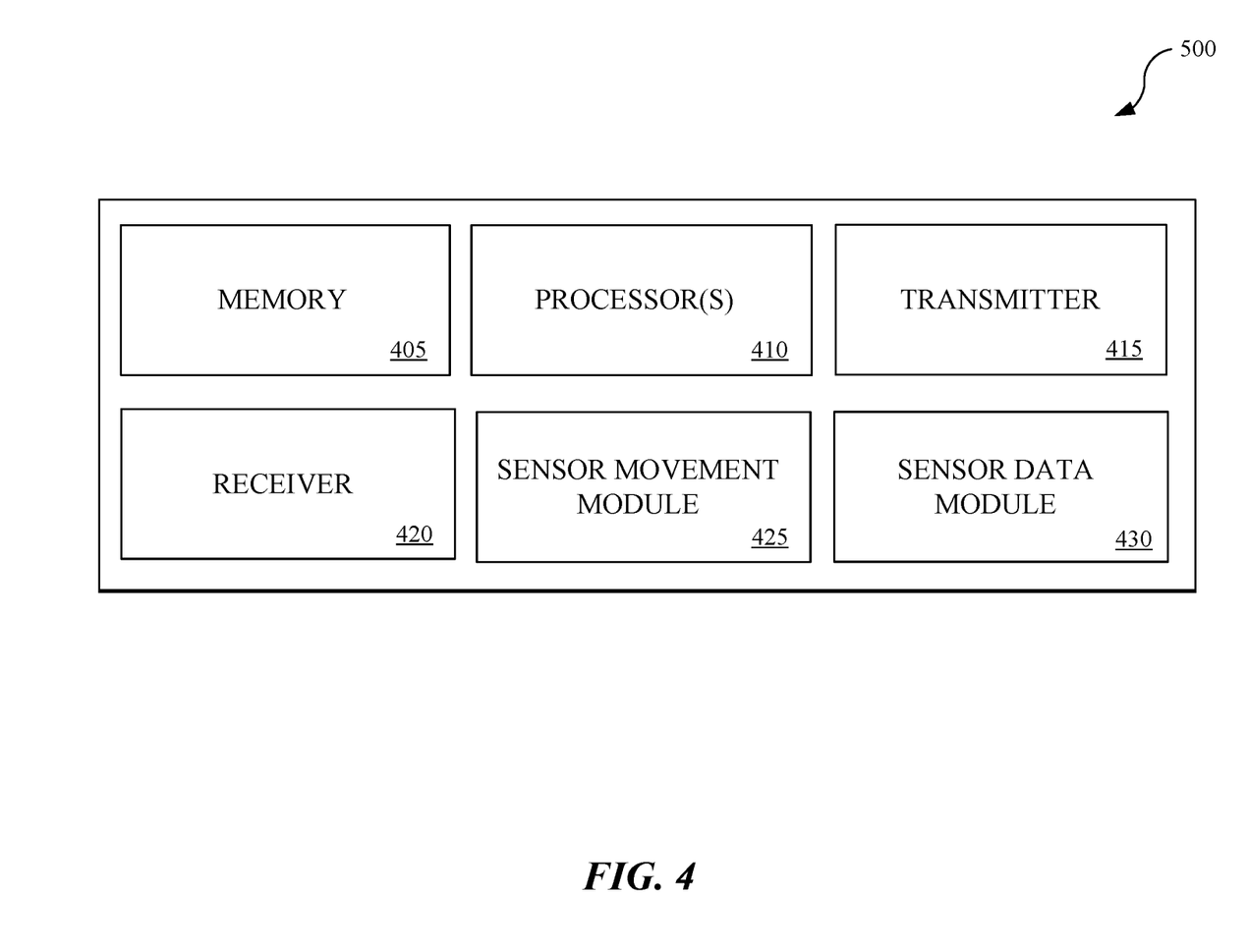
FIG. 4 shows an exemplary block diagram of a computer located in an autonomous vehicle.

A computer located in an autonomous vehicle is communicably coupled to one or more motors associated with one or more movable telescopic apparatuses on the autonomous vehicle and/or to one or more motors associated with one or more optional housing for the one or more movable telescopic apparatuses. As shown in FIG. 4, the computer includes sensor movement module (shown as 425 in FIG. 4) and a sensor data module (shown as 430 in FIG. 4) that can perform operations related to the movable telescopic apparatus and related to the sensor coupled to the movable telescopic apparatus.

The motor associated with the movable telescopic apparatus and/or the motor associated with the optional housing in which the movable telescopic apparatus is located can be operated by the sensor movement module based on information obtained by a sensor data module. A sensor data module can determine that sensor data (e.g., an image) from a fixed sensor (e.g., fixed camera) includes a presence of an obstructing object that prevents the sensor data module from determining trajectory information of the autonomous vehicle (e.g., direction in which to move the autonomous vehicle) and/or prevents the sensor data module from determining instructions (e.g., related throttle and/or steering) to move the autonomous vehicle.

When the sensor data module determines that sensor data from the fixed sensor includes the presence of the obstructing object that prevents the sensor data module from determining trajectory information or from determining instructions to move the autonomous vehicle, then the sensor data module can send an indication that triggers the sensor movement module to extend or move a sensor on a movable telescopic apparatus associated with the fixed sensor. The sensor movement module can send instruction to actuate a motor associated with the movable telescopic apparatus to extend or move the sensor. In embodiments that include a housing, the sensor movement module first sends instruction to open the cover of the housing and then sends instruction to actuate the motor associated with the movable telescopic apparatus to extend or move the sensor.

The distance and/or direction of movement of the platforms 204 and 256 can be controlled by a sensor movement module. Regarding the distance of the movement, the sensor movement module can actuate a motor of a movable telescopic apparatus to move a sensor located on the movable telescopic apparatus up to a certain position. For example, if the movable telescopic apparatus can move up to two-feet from a neutral position of the movable telescopic apparatus or from a surface (e.g., roof) of the autonomous vehicle, then the sensor movement module can actuate a motor of the movable sensor apparatus to move the sensor at any position up to two-feet.

In some embodiments, the sensor movement module can incrementally move the sensor up to one or more pre-determined distances from a neutral position of the movable telescopic apparatus. The pre-determined distances can be configured to move a sensor to a near position (e.g., 0.5 feet from neutral position in above-mentioned example), a middle position (e.g., 1.0 foot from neutral position in above-mentioned example), and/or a far position (e.g., 2 feet from the neutral position in the above-mentioned example).

Thus, in the above-mentioned example, the sensor movement module can first move the sensor up to 0.5 feet from neutral position, and as further described in this section, the sensor data module can analyze the sensor data of the sensor that is moved to 0.5 feet to determine whether an obstructing object is absent or mostly absent. If the sensor data module determines that obstructing object is not absent or not mostly absent from the sensor data, then the sensor data module can trigger the sensor movement module to move the sensor to a position further away from the autonomous vehicle (e.g., at 1.0 foot) and can repeat the process mentioned above to analyze whether the obstructing object or most of the obstructing object is absent from the sensor data of sensor located at 1.0 foot from neutral position. A technical benefit of incrementally moving the sensor is that it enables the sensor movement module to extend the sensor just enough or to sufficiently extend the sensor to obtain sensor data without the obstructing object or without most of the obstructing object.

A sensor data module can determine that sensor data obtained from a sensor on a movable telescopic apparatus does not include the obstructing object or does not include most of the obstructing object by comparing the sensor data from the sensor on the movable telescopic apparatus with sensor data from the fixed sensor. The sensor data module can determine by comparing the moved sensor's sensor data with the fixed sensor's sensor data whether the obstructing object is absent or whether at least some portion of the obstructing object is present in the sensor data of the moved sensor. In some cases, by actuating the movable telescopic apparatus, the sensor on the movable telescopic apparatus can obtain sensor data without the obstructing object (e.g., as described in FIG. 1B). Thus, in some embodiments, if the movable sensor data determines that an obstructing object included in the sensor data of the fixed sensor is absent from the sensor data of the moved sensor, then the movable sensor module can determine that the moved sensor has successfully obtained sensor data without the obstructing object, the movable sensor module can instruct the sensor movement module to retract the movable telescopic apparatus, and/or the movable sensor module can perform additional computations to determine trajectory instructions and/or movement related instructions (e.g., steering, throttle, brakes, etc.) for the autonomous vehicle However, in some other cases, the sensor data obtained by the sensor on the extended movable telescopic apparatus can still include some of the obstructing image. In some embodiments, if the movable sensor data determines that the sensor data obtained by the moved sensor includes at most a portion of the obstructing object whose size is less than or equal to a pre-determined fraction (e.g., less than or equal to 10%, less than or equal to 0.2, etc.) of the size of the obstructing object included in the sensor data of the fixed sensor, then the sensor data module can determine that the moved sensor has successfully obtained sensor data without most of the obstructing object, the movable sensor data can instruct the sensor movement module to retract the movable telescopic apparatus and/or perform additional computations as mentioned above.

In some embodiments, a distance by which the movable telescopic apparatus is to extend or a position up to which the movable telescopic apparatus is to extend may be based on the speed of the autonomous vehicle. For example, if the autonomous vehicle is driven at a speed less than 10 mph, then the sensor movement module can instruct the movable telescopic apparatus to be extended up to 2 feet in the above-mentioned example. However, in one example, if the autonomous vehicle's speed between 10 mph and 20 mph, then the sensor movement module can instruct the movable telescopic apparatus to be extended up to 1 foot in the above-mentioned example. Thus, in some embodiments, the distance by which the movable telescopic apparatus is instructed to extend may be inversely related to the speed of the autonomous vehicle.

Regarding the direction of movement, the sensor movement module can determine which of the one or more movable telescopic apparatus on an autonomous vehicle to actuate based on (1) a direction of movement of the movable telescopic apparatus (e.g., forward/backward, up/down, etc.) and (2) a direction in which the sensor on the movable telescopic apparatus is oriented. The sensor movement module can determine the direction in which to extend a sensor and can select an appropriate movable telescopic apparatus that can be actuated to move in the determined direction. For example, a telescopic sensor system may include two movable telescopic apparatuses on a roof of the autonomous vehicle with sensors that may be oriented in a same direction (e.g., towards area(s) in front of the autonomous vehicle) or with sensors that may be oriented in different directions (e.g., towards areas in front and side of autonomous vehicle).

In the above-mentioned example, one movable telescopic apparatus can be designed to move forward and backward (e.g., towards and away from a front bumper) and the other movable telescopic apparatus can be designed to move up and down (e.g., away from and towards the roof). The sensor movement module can independently control the motors of the two movable telescopic apparatuses and can thereby independently control the directions in which to actuate the movable telescopic apparatuses to successfully obtain sensor data without the obstructing object or without most of the obstructing object. Thus, if the sensor movement module determines that a sensor located on a roof of the autonomous vehicle should be moved forward, then the sensor movement module can select and send instructions to a movable telescopic apparatus located on a roof that can be actuated to move forward. Also, if the sensor movement module determines that sensor data of an area located in front of an autonomous vehicle includes an obstructing object, then the sensor movement module can determine to move a movable telescopic apparatus having a sensor oriented to scan/obtain images of the area towards the front of the autonomous vehicle.

In some embodiments, the sensor movement module can store on a computer located in the autonomous vehicle a lookup table in which multiple movable telescopic apparatus can be listed along with the direction in which they move (e.g., up/down, forward/backward, etc.), locations of the movable telescopic apparatus on the autonomous vehicle (e.g., front bumper, roof middle, roof left side, etc.), and directions in which the sensors on the movable telescopic apparatus are oriented (e.g., front of autonomous vehicle, side left of autonomous vehicle, side right of autonomous vehicle, rear right of autonomous vehicle, etc.). The sensor movement module can refer to the lookup table to select an appropriate movable telescopic apparatus and an appropriate sensor to obtain sensor data without an obstructing object or without most of the obstructing object.

In some embodiments, the sensor movement module can prevent the movable telescopic apparatus to be actuated under some scenarios. For example, the sensor movement module can prevent the movable telescopic apparatus to be actuated when the autonomous vehicle is driven at a speed greater than or equal to a pre-determined speed (e.g., greater than or equal to 30 mph). Such a feature is technically advantageous as it at maximize fuel efficiency and protect the movable telescopic apparatus and its sensor from any damage from other objects (e.g., branches, overhead bridge, traffic light structure, etc.). In some embodiments, a distance by which the movable telescopic apparatus is to extend may be based on the speed of the autonomous vehicle.

In some driving scenarios, a sensor may be prevented from fully capturing sensor data of an area by a permanent obstructing object (e.g., bridge, trees, curved road, etc.). In some embodiments, the sensor movement module can store a databased in a computer located in the autonomous vehicle, where the database includes a global positioning system (GPS) location of permanent obstructing objects. An autonomous vehicle includes a GPS unit that is communicably coupled to the computer in the autonomous vehicle so that the sensor movement module can determine whether the autonomous vehicle is within a pre-determined distance of a GPS location where a permanent obstructing object is located. If the sensor movement module determines that the autonomous vehicle is within the pre-determined distance of the permanent obstructing object's GPS location, the sensor movement module may refer to the database which may store information about an appropriate movable telescopic apparatus to extend to obtain a better sensor data of an area around or past the permanent obstructing object.

Figure 3:
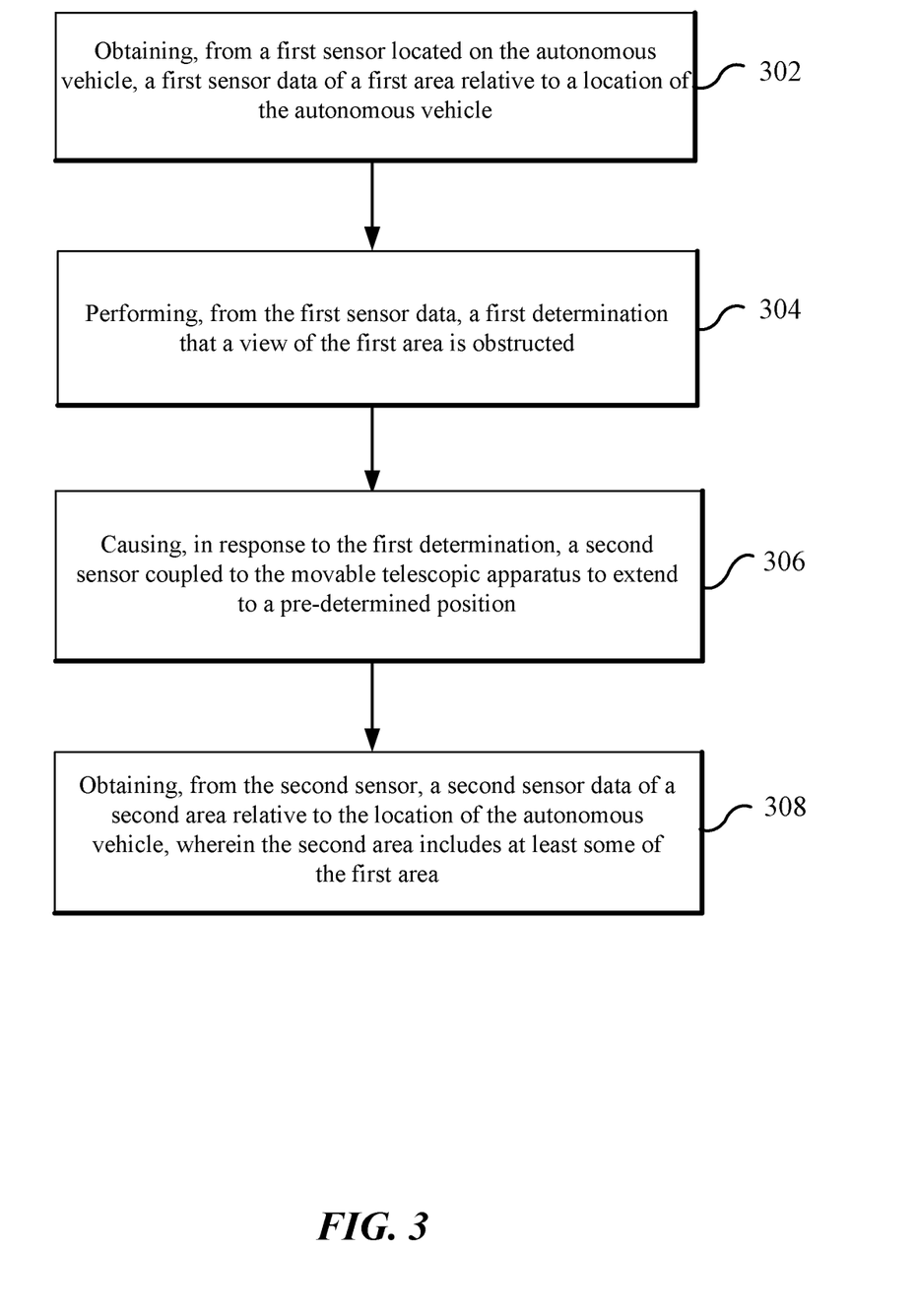
FIG. 3 shows an example flow diagram to operate a movable telescopic apparatus on an autonomous vehicle.

FIG. 3 shows an example flow diagram to operate a movable telescopic apparatus on an autonomous vehicle. At operation 302, the sensor data module obtains, from a first sensor located on the autonomous vehicle, a first sensor data of a first area relative to a location of the autonomous vehicle. At operation 304, the sensor data module performs, from the first sensor data, a first determination that a view of the first area is obstructed. In some embodiments, the first determination at operation 304 is performed by the sensor data module by determining that a presence of an object in the first area obstructs the sensor from obtaining the sensor data of a least a portion of the first area obstructed by the object.

At operation 306, the sensor movement module causes, in response to the first determination, a second sensor coupled to the movable telescopic apparatus to extend to a pre-determined position. At operation 308, the sensor data module obtains, from the second sensor, a second sensor data of a second area relative to the location of the autonomous vehicle, where the second area includes at least some of the first area.

In some embodiments, the method of FIG. 3 further includes performing a second determination that the object is absent from the second sensor data or that the second sensor data includes at most a portion of the object having a first size less than or equal to a pre-determined fraction of a second size of the object in the first sensor data; and causing, in response to the second determination, the movable telescopic apparatus to retract towards the autonomous vehicle to a retracted position.

In some embodiments, the movable telescopic apparatus is caused to extend and retract by sending instructions to actuate a motor associated with the movable telescopic apparatus. In some embodiments, the movable telescopic apparatus includes a housing in which the second sensor and the movable telescopic apparatus in the retracted position is located, where the method of FIG. 3 further includes sending, before sending a first instruction to the motor to extend the movable telescopic apparatus, a second instruction to another motor associated with the housing, where the third instruction causes a cover associated with the housing to open by actuating the another motor; and sending, after sending a third instruction to the motor to retract the movable telescopic apparatus, a fourth instruction that causes the cover to close by actuating the another motion. In some embodiments, the method of FIG. 3 further includes causing the movable telescopic apparatus to remain in the retracted position in response to a speed of the autonomous vehicle being greater than or equal to a speed threshold.

In some embodiments, the method of FIG. 3 further includes performing a third determination that the second sensor data includes at most a portion of the object having a first size greater than a pre-determined fraction times a second size of the object in the first sensor data; and causing, in response to the third determination, the second sensor coupled to the movable telescopic apparatus to extend to a second pre-determined position, where the second pre-determined position is located further away from the autonomous vehicle compared to the pre-determined position.

In some embodiments, the movable telescopic apparatus is extendable to a plurality of pre-determined positions, and where the pre-determined position is selected from the plurality of pre-determined positions based on a speed of the autonomous vehicle. In some embodiments, the movable telescopic apparatus is extendable to a plurality of pre-determined positions, and where the pre-determined position is selected from the plurality of pre-determined positions. In some embodiments, prior to the causing the second sensor coupled to the movable telescopic apparatus to extend to the pre-determined position, the method further comprises selecting, from a plurality of sensors or a plurality of movable telescopic apparatus, the second sensor or the movable telescopic apparatus based on a type of sensor associated with the first sensor and based on a direction in which the first sensor is oriented.

In some embodiments, the second sensor data is obtained after the movable telescopic apparatus is extended to the pre-determined position. In some embodiments, the movable telescopic apparatus includes a double scissor structure or a telescopic rod. In some embodiments, the first sensor is a sensor that is fixed in position on the autonomous vehicle. In some embodiments, the first sensor and the second sensor are a same type of sensor. In some embodiments, the first sensor and the second sensor include a first camera and a second camera, or a first Light Detection and Ranging (LiDAR) sensor and a second LiDAR sensor, or a first radar and a second radar.

In some embodiments, the method of FIG. 3 further includes performing a second determination that the second sensor data includes at most a portion of the object; and causing, in response to the second determination, the movable telescopic apparatus to retract towards the autonomous vehicle to a retracted position. In some embodiments, the method of FIG. 3 further includes performing a third determination that the second sensor data includes at most a portion of the object; and causing, in response to the third determination, the second sensor coupled to the movable telescopic apparatus to extend to a second pre-determined position, where the second pre-determined position is located further away from the autonomous vehicle compared to the pre-determined position.

FIG. 4 shows an exemplary block diagram of a computer 400 located in an autonomous vehicle. The computer 400 includes at least one processor 410 and a memory 405 having instructions stored thereupon. The instructions upon execution by the processor 410 configure the computer 400 to perform the operations related to sensor movement module and/or sensor data module as described in FIGS. 1B to 3 and in the various embodiments described in this patent document. The transmitter 415 transmits or sends output values to control one or more motors to extend, retract, or move the movable telescopic apparatus on the autonomous vehicle. The receiver 420 receives information or data transmitted or sent by one or more sensors (e.g., cameras, LiDAR, GPS unit) on the autonomous vehicle.

In this document the term "exemplary" is used to mean "an example of" and, unless otherwise stated, does not imply an ideal or a preferred embodiment.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this disclosure.

What is claimed is:

1. A method of controlling a movable apparatus on a vehicle, comprising:
   determining, by a computer located in the vehicle, that a first sensor data of a first area located relative to a location of the vehicle is obstructed;
   causing, in response to the determining, the movable apparatus to move a sensor coupled to the movable apparatus relative to the vehicle to capture a second sensor data of a second area located relative to the location of the vehicle; and
   obtaining, from the sensor, the second sensor data of the second area located relative to the location of the vehicle, wherein the second area includes at least some of the first area.

2. The method of claim 1, wherein the movable apparatus is caused to move the sensor by controlling a distance travelled by the movable apparatus.

3. The method of claim 2,
   wherein the distance travelled by the movable apparatus is controlled by causing the movable apparatus to move to a pre-determined distance from a neutral position or a retracted position of the movable apparatus, and
   wherein the pre-determined distance is from a plurality of pre-determined distances from the neutral position or the retracted position of the movable apparatus.

4. The method of claim 2,
   wherein the distance travelled by the movable apparatus is controlled by causing the movable apparatus to incrementally move from a first pre-determined distance from a neutral position or a retracted position of the movable apparatus to a second pre-determined distance from the neutral position or the retracted position of the movable apparatus,
   wherein the first pre-determined distance is less than the second pre-determined distance.

5. The method of claim 4,
   wherein the second sensor data of the second area is obtained by the sensor when the movable apparatus is at the first pre-determined distance, and
   wherein the movable apparatus is caused to move from the first pre-determined distance to the second pre-determined distance upon determining that the second sensor data is obstructed.

6. The method of claim 4,
   wherein the first sensor data is determined to be obstructed upon determining that the first sensor data includes an object that obstructs a least a portion of the first area, and
   wherein the method further comprises:
   determining, by comparing a third sensor data with the first sensor data, that the third sensor data obtained by the sensor located at the second pre-determined distance does not include the object.

7. The method of claim 4,
   wherein the first sensor data is determined to be obstructed upon determining that the first sensor data includes an object that obstructs a least a portion of the first area, and
   wherein the method further comprises:
   determining, by comparing a third sensor data with the first sensor data, that the third sensor data obtained by the sensor located at the second pre-determined distance includes a portion of the object having a second size is less than or equal to a pre-determined fraction of a first size of the object included in the first sensor data.

8. A system, comprising:
   a computer located in a vehicle, the computer comprising at least one processor and a memory comprising stored instructions that upon execution configure the at least one processor to:
   determine that a first sensor data of a first area located relative to a location of the vehicle is obstructed;
   cause, in response to the determining, a movable apparatus to move a sensor coupled to the movable apparatus relative to the vehicle to capture a second sensor data of a second area located relative to the location of the vehicle; and
   obtain, from the sensor, the second sensor data of the second area located relative to the location of the vehicle, wherein the second area includes at least some of the first area.

9. The system of claim 8, wherein the movable apparatus is caused to move the sensor while the vehicle is stopped.

10. The system of claim 8, wherein the at least one processor is further configured to:
    prevent the movable apparatus to move the sensor upon a determination that a speed of the vehicle is greater than a pre-determined value.

11. The system of claim 8, wherein the sensor is located adjacent to another sensor located on the vehicle, wherein the another sensor obtains the first sensor data of the first area.

12. The system of claim 8, wherein the movable apparatus is located on a roof of the vehicle, on a bumper of the vehicle, or on a side of the vehicle.

13. The system of claim 8, wherein the sensor includes a camera or a Light Detection and Ranging (LiDAR) sensor.

14. A non-transitory computer readable storage medium having code stored thereon, the code, when executed by a processor, causing the processor to implement a method comprising:
    determining, by a computer located in a vehicle, that a first sensor data of a first area located relative to a location of the vehicle is obstructed;
    causing, in response to the determining, a movable apparatus to move a sensor coupled to the movable apparatus relative to the vehicle to capture a second sensor data of a second area located relative to the location of the vehicle; and
    obtaining, from the sensor, the second sensor data of the second area located relative to the location of the vehicle, wherein the second area includes at least some of the first area.

15. The non-transitory computer readable storage medium of claim 14, wherein the movable apparatus is caused to move the sensor while the vehicle is in motion.

16. The non-transitory computer readable storage medium of claim 14, wherein the causing the movable apparatus to move the sensor is performed in response to:

determining that the location of the vehicle is within a pre-determined distance of another location of an object that is previously known to obstruct; and selecting the movable apparatus from a database that identifies the movable apparatus as being associated with obtaining sensor data around or past the object.

17. The non-transitory computer readable storage medium of claim 14, wherein the movable apparatus is caused to move the sensor by sending instructions to actuate a motor associated with the movable apparatus.

18. The non-transitory computer readable storage medium of claim 14, wherein prior to the causing the movable apparatus to move the sensor, the movable apparatus is selected from a plurality of movable apparatus upon determining that a direction in which the movable apparatus moves is same as a desired direction of movement and upon determining that the sensor is orientated towards a desired area.

19. The non-transitory computer readable storage medium of claim 18, wherein the computer stores a table that lists the plurality of movable apparatus and, for each movable apparatus, a corresponding direction of movement.

20. The non-transitory computer readable storage medium of claim 14, wherein the causing the movable apparatus to move the sensor comprises causing the movable apparatus to extend or retract.

* * * * *